United States Patent [19]
Kamauchi et al.

[11] Patent Number: 5,614,334
[45] Date of Patent: Mar. 25, 1997

[54] MATERIAL FOR LITHIUM BATTERY POSITIVE ELECTRODE AND PRODUCTION THEREOF

[75] Inventors: Masahiro Kamauchi; Yoshinori Takada, both of Amagasaki, Japan

[73] Assignee: Mitsubishi Cable Industries, Ltd., Amagasaki, Japan

[21] Appl. No.: 481,257

[22] PCT Filed: Nov. 17, 1993

[86] PCT No.: PCT/JP93/01686

§ 371 Date: Jun. 30, 1995

§ 102(e) Date: Jun. 30, 1995

[87] PCT Pub. No.: WO95/12900

PCT Pub. Date: May 11, 1995

[30] Foreign Application Priority Data

Nov. 2, 1993 [JP] Japan .................................. 5-297405

[51] Int. Cl.⁶ .............................. H01M 4/52; H01M 4/62
[52] U.S. Cl. .................... 429/217; 429/218; 427/126.3; 427/388.5
[58] Field of Search ................ 427/126.3, 388.5; 429/217, 218; 29/623.5

[56] References Cited

U.S. PATENT DOCUMENTS

| | | | |
|---|---|---|---|
| 3,736,184 | 5/1973 | Dey et al. | |
| 4,223,080 | 9/1980 | Auborn | 429/194 |
| 4,751,158 | 6/1988 | Uchiyama et al. | 424/194 |
| 5,187,035 | 2/1993 | Miyabayashi et al. | 429/194 |
| 5,196,278 | 3/1993 | Idota | 424/218 |
| 5,246,796 | 9/1993 | Nagamine et al. | 429/194 |
| 5,286,582 | 2/1994 | Takara et al. | 429/218 |
| 5,415,958 | 5/1995 | Takahashi et al. | 429/217 |

FOREIGN PATENT DOCUMENTS

| | | |
|---|---|---|
| 0014931 | 9/1980 | European Pat. Off. |
| 4056064 | 6/1992 | European Pat. Off. |
| 0501187 | 9/1992 | European Pat. Off. |
| 0571858 | 12/1993 | European Pat. Off. |
| 57-105966 | 7/1982 | Japan |
| 58-147965 | 9/1983 | Japan |
| 59-90364 | 5/1984 | Japan |
| 63-187571 | 3/1988 | Japan |
| 5-47383 | 2/1993 | Japan |
| 5036411 | 12/1993 | Japan |

OTHER PUBLICATIONS

Supplementary European Search Report for Application No. EP 94 90 0277 (Sep. 1995).

Journal of Power Sources, vol. 40, No. 3, Dec. 15, 1992, pp. 347–353 "Synthesis of $LiCoO_2$ from cobalt–organic acid complexes and its electrode behavior in a lithium secondary battery".

European Search Report for Application Number EP 93 10 8004 (Aug. 1993).

*Primary Examiner*—Stephen Kalafut
*Attorney, Agent, or Firm*—Varndell Legal Group

[57] ABSTRACT

The material for a lithium battery positive electrode of the present invention is characterized in that a powder of an active material comprising at least one member selected from the group consisting of lithium phosphates, lithium-cobalt phosphates, cobalt oxides and lithium-cobalt oxides, wherein lithium, cobalt and phosphorus are contained in a proportion of more than 0.1 mole of cobalt and more than 0.2 mole of phosphorus both per mole of lithium, is formed into a sheet using a binder comprising an organic polymer, and the present invention affords a material for a lithium battery positive electrode, which is superior in practical use and production efficiency, without impairing the high electromotive force of the novel active material having the aforementioned composition. The production method of the present invention is characterized by extending a binder solution comprising a powder of the above-mentioned active material on a long support sheet, and drying, and affords a long material for a lithium battery positive electrode stably and efficiently by a continuous process.

14 Claims, 4 Drawing Sheets

MATERIAL FOR LITHIUM BATTERY POSITIVE ELECTRODE AND PRODUCTION THEREOF

TECHNICAL FIELD

The present invention relates to a material, in a sheet form, for a lithium battery positive electrode, which is advantageously used for forming a cylindrical secondary battery having a high electromotive force, and the production of such long sheet.

BACKGROUND ART

There have been known, as positive electrodes capable of forming a lithium battery having a high electromotive force, positive electrodes using $LiCoO_2$ as an active material. The group of the present inventors has found an active material comprising at least one member selected from the group of lithium phosphates, lithium-cobalt phosphates, cobalt oxides and lithium-cobalt oxides, wherein lithium, cobalt and phosphorus are contained in a proportion of more than 0.1 mole of cobalt and more than 0.2 mole of phosphorus both per mole of lithium.

The novel active material having the composition as mentioned above is characterized in that it also comprises phosphorus besides lithium, cobalt and oxygen. The addition of phosphorus leads to a less mass and increases lithium ion incorporation per unit weight, which ultimately results in increased capacities. By using said active material for a positive electrode, primary or secondary lithium batteries superior in electromotive force, discharge voltage, discharge capacity and energy density, and having a still higher electromotive force than the conventional batteries using $LiCoO_2$, can be obtained.

DISCLOSURE OF THE INVENTION

In general terms, batteries have greatly diverse properties depending on the combination of starting materials, which is possibly due to microelectric chemical reactions they undergo. Accordingly, practical batteries are made to exhibit the specific properties they have by deliberately balancing the respective materials. When the main components are changed, therefore, new materials should be developed, so that a battery capable of exhibiting the properties based on the new main components can be fabricated.

The present invention aims at providing a material for a positive electrode of a lithium battery, which is superior in practical use and production efficiency, without impairing the high electromotive force afforded by the aforementioned novel active material.

The present invention provides a material for lithium battery positive electrodes, characterized in that a powder of an active material comprising at least one member selected from the group consisting of lithium phosphates, lithium-cobalt phosphates, cobalt oxides and lithium-cobalt oxides, wherein lithium, cobalt and phosphorus are contained in a proportion of more than 0.1 mole of cobalt and more than 0.2 mole of phosphorus both per mole of lithium, is formed into a sheet using a binder comprising an organic polymer, and a method for producing a material for a lithium battery positive electrode, which is characterized by extending a binder solution comprising a powder of the above-mentioned active material, on a long support sheet, and drying.

By using the positive electrode material of the construction as mentioned above, a material, in a sheet form, for lithium battery positive electrodes, which is superior in practical use and production efficiency, can be provided without impairing the high electromotive force of a novel active material having the above-mentioned composition. According to the production method mentioned above, a long sheet for lithium battery positive electrodes can be stably and efficiently obtained by a continuous process.

DETAILED DESCRIPTION OF THE INVENTION

Figure 1:
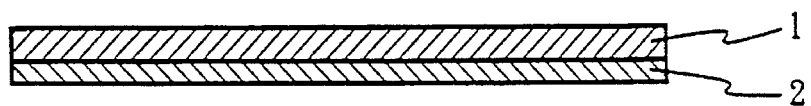
FIG. 1 is a sectional view of an embodiment of a positive electrode material.

One example of the material for lithium battery positive electrodes of the present invention is shown in FIG. 1, wherein 1 is a layer containing an active material powder held by a binder and 2 is a support sheet.

As the above-mentioned lithium phosphate, exemplified are salts of lithium with phosphoric acid such as metaphosphoric acid, pyrophosphoric acid, orthophosphoric acid, triphosphoric acid and tetraphosphoric acid, with preference given to a salt of lithium with orthophosphoric acid. Examples of the lithium-cobalt phosphate include $Li_2CoPO_5$, $LiCoPO_4$, $LiCo_{0.9}P_{0.1}O_2$ and $LiCo_{0.5}P_{0.5}O_2$, with preference given to $LiCoPO_4$. Examples of the cobalt oxide include $CoO$, $Co_2O_3$, $CoO_2$ and $Co_3O_4$, with preference given to $Co_3O_4$. Examples of lithium-cobalt oxide include $LiCoO_2$, $Li_6CoO_4$, $Li_{0.73}CoO_2$ and $Li_{0.63}CoO_2$, with preference given to $LiCoO_2$.

The novel active material comprises at least one member selected from the group consisting of lithium phosphates, lithium-cobalt phosphates, cobalt oxides and lithium-cobalt oxides, wherein lithium, cobalt and phosphorus are contained in a proportion of more than 0.1 mole of cobalt and more than 0.2 mole of phosphorus both per mole of lithium. They may be used alone or in combination, as long as they satisfy said molar ratio.

That is, lithium-cobalt phosphate may be used alone, or cobalt oxide, and lithium phosphate or lithium-cobalt phosphate in two kinds of combinations; cobalt oxide and other two materials in three kinds of combinations; or a mixture of the four may be used. Of these, a mixture of three or more kinds of the compounds is preferable, since a lithium battery having a high electromotive force can be obtained thereby. Particularly preferred is a mixture containing the three kinds of at least cobalt oxide, lithium phosphate and lithium-cobalt phosphate.

When producing the novel active material, each transition metal such as nickel, iron, manganese, chromium and vanadium, oxide thereof, hydroxide thereof, salt thereof such as carbonate, nitrate and organic acid salt, or organic compound thereof may be added. In this case, a compound wherein part of cobalt of the above-mentioned cobalt-containing compound is substituted by the aforementioned transition metal is produced.

When producing the novel active material, it is essential that the predetermined amounts of respective starting materials be added, so that the amount of cobalt is more than 0.1 mole and that of phosphorus is more than 0.2 mole, both per mole of lithium, preferably 0.2–0.75 mole of cobalt and 0.25–1.8 moles of phosphorus, both per mole of lithium, whereby a lithium phosphate and/or lithium-cobalt phosphate are/is prepared.

When the molar number of cobalt is not more than 0.1 per mole of lithium, charging is unattainable, whereas that of more than 0.75 results in undesirable small capacity. On the other hand, when the phosphorus is not more than 0.2 mole, the above-mentioned phosphate is not produced sufficiently, whereas the amount exceeding 1.8 moles results in insufficient formation of the above-mentioned phosphate, due to the relatively decreased amount of lithium, thus leading to an undesirably less discharge voltage.

The novel active material is prepared by an appropriate method for producing ceramic, such as solid phase method, sintering method, sol-gel method, CVD method, PVD method, thermal spraying method and thermal decomposition method. The powder of the novel active material can be obtained by, for example, pulverizing the powder produced in the above, according to an appropriate method such as by using a ball mill. While the particle size of the powder is determined as appropriate according to the object of use, it is generally not more than 100 μm in terms of the surface area of the electrode thus formed, with preference given to not more than 50 μm, particularly not more than 20 μm.

The material for a lithium battery positive electrode of the present invention can be formed by retaining the powder of the novel active material in a sheet form using a binder. Accordingly, the binder should be able to retain the sheet form by cohering the powder of the novel active material. When a battery having a structure, wherein a positive electrode is immersed in an electrolyte solution, is desired, a binder capable of retaining the cohesion of the powder of the novel active material in the electrolyte solution is used.

Generally used as the binder is an organic polymer. Examples of the polymer are various polymers conventionally used, which are typically thermoplastic polymers such as ethylene-propylene-diene terpolymer, acrylonitrile polymer, fluororesin and polyethylene. In addition, appropriate thermosetting polymers such as heat-curing acrylic polymers are exemplified.

The binder preferably used in relation to the novel active material is a fluororesin which is exemplified by homopolymers of a kind of monomer having at least one carbon-fluorine bond on the main chain or branched chain and copolymers of two or more members selected from the group of the aforementioned monomers and oligomers.

Examples of the above-mentioned fluororesin include polytetrafluoroethylene (PTFE), tetrafluoroethylene-perfluoroalkyl vinyl ether copolymer (PFA), tetrafluoroethylene-hexafluoropropylene copolymer (FEP), tetrafluoroethylene-hexafluoropropylene-perfluoroalkyl vinyl ether copolymer (EPE), tetrafluoroethylene-ethylene copolymer (ETFE), poly(vinyl fluoride) (PVF), polyhexafluoropropylene, poly(vinylidene fluoride) (PVDF) and vinylidene fluoride-hexafluoropropylene-tetrafluoroethylene copolymer.

The positive electrode material of the present invention has a structure wherein the powder of a novel active material is homogeneously dispersed in a binder, and optionally contains a conductivity-imparting substance such as carbon black. The positive electrode material can be produced by a dry method, a wet method or other methods. In the dry method, the necessary constituent materials are mixed and kneaded in a twin-roll mill, Bambury mixer and the like, and formed into a desired sheet by extrusion forming using a T die.

In the wet method, a powder of the novel active material is dispersed in a liquid obtained by dissolving or dispersing an organic polymer in an organic solvent, water and the like (hereinafter the final liquid is referred to as binder solution) and the binder solution is applied to a suitable support sheet and dried to give a desired sheet.

When producing a positive electrode material, the binder solution is used in the form of a paste or a dispersion. In the present invention, a paste is preferable in terms of easiness of forming sheets.

While the binder solution is applied by an optional method, it is advantageously applied continuously by, for example, doctor blade method, roll forming method, dipping method, spray method and the like, to a long support sheet, while moving the sheet using a sieve and the like, in consideration of the stable and efficient forming of a long sheet by a continuous process.

The above-mentioned binder solution is prepared by homogeneously dispersing a powder of a novel active material in a solution or dispersion obtained by dissolving or dispersing the aforementioned organic polymer in, for example, a suitable organic solvent such as cyclohexane (CyH), dimethylformamide (DMF) and N-methyl-2-pyrrolidone (NMP), or water.

When the organic polymer is insoluble in water or organic solvent, like PTFE, a powder of a novel active material can be dispersed in a dispersion obtained by dispersing a micropowder of the polymer in water or an organic solvent. In the present invention, however, the use of an organic solvent, rather than water, for a binder solution is particularly preferable for the reasons set forth below.

That is, the positive electrode material needs to be dried after forming. In general, water is difficult to remove in comparison with organic solvents, and is industrially disadvantageous. In addition, the residual water due to insufficient dehydration possibly results in increase of overvoltage by the reaction thereof with a positive electrode material, negative electrode material or electrolyte in the battery; corrosion of metals in the battery; and degraded battery performance due to the electrolysis of the residual water. When water is used, therefore, sufficient drying, such as by heating in vacuo, is recommended to make the residual water content not more than 0.1% by weight, particularly not more than 0.01% by weight.

When an organic solvent is used, removing of the solvent is markedly easier than water. The problems caused by residual solvent are less and the degree of the adverse influence is far smaller than that caused by the residual water.

In the present invention, the residual organic solvent content is not more than 1% by weight, preferably not more than 0.1% by weight.

In the present invention, an organic polymer soluble in an organic solvent is preferably used for the reasons stated above, and particularly preferred is a fluororesin from the aspect of chemical stability. Specifically, poly(vinylidene fluoride) (PVDF) is preferable, in that it causes small overvoltage, can dissolve in many organic solvents, permitting easy paste forming, and is superior in binding property, making the PVDF content smaller when forming a positive electrode sheet.

The organic solvent to be used for preparing the above-mentioned binder solution is preferably N-methyl-2-pyrrolidone (NMP), dimethyl sulfoxide (DMSO), γ-butyrolactone (γ-BL), propylene carbonate (PC), ethylene carbonate (EC), dimethylformamide (DMF) and the like, in which the above-mentioned fluororesin can be dissolved. In particular, NMP and DMSO can lower the viscosity of the binder solution and are superior in formability when using, for example, a doctor blade.

The proportions of the powder of a novel active material and an organic polymer may be appropriately determined depending on the cohesion of said powder. In general, an organic polymer is used in a proportion of 0.1–20 parts by weight, preferably 1–5 parts by weight per 100 parts by weight of the powder of the novel active material.

The content of the solid in the binder solution is appropriately determined depending on the flowability necessary for the coating method. The binder solution generally has a solid content of 1–70% by weight. The binder solution may further contain suitable substances such as a conductive material (e.g. acetylene black and ketzen black) depending on the desired material for a lithium battery positive electrode.

The support sheet to be applied with the above-mentioned binder solution may be formed from appropriate materials such as releasing paper and conductive sheets, such as aluminum sheet and copper sheet. The releasing paper is preferable when moving a positive electrode material formed thereon onto another support material.

A conductive sheet can be preferably used when it is utilized as a material for a positive electrode having a collector layer. The conductive sheet generally has a non-limiting thickness of 5–300 μm. While the conductive sheet is generally a metal sheet, a conductive plastic sheet may be also used and the material thereof is not particularly limited.

The thickness of the positive electrode material to be formed on the above-mentioned support sheet is generally, but not limited to, 5–500 μm, particularly 50–300 μm, and the thickness can be determined as appropriate in the present invention, according to the object of use.

Figure 2:
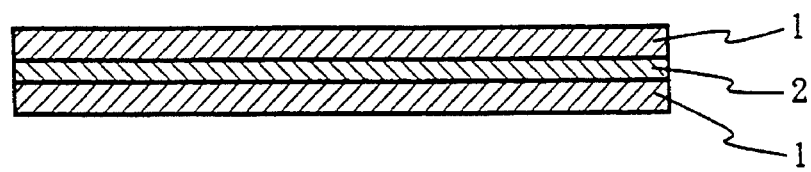
FIG. 2 is a sectional view of another embodiment of a positive electrode material.

In the present invention, moreover, a layer 1 containing an active material powder, which is shape-retained on the both sides of a support sheet 2 with a binder, can be also formed, as shown in FIG. 2.

The positive electrode material of the present invention is used for forming a positive electrode of a primary or secondary lithium battery, and the electrode can be formed into a suitable form using the sheet, according to the mode of the desired lithium battery. For example, a long sheet may be wound to form a cylindrical battery or formed into an appropriate size to manufacture a laminate type square battery. As the negative electrode of the lithium battery, lithium, alloy thereof, carbon and other suitable materials can be used.

PREPARATIVE EXAMPLE 1

Lithium carbonate, basic cobalt carbonate, and a 85% aqueous solution of phosphoric acid were mixed at an atomic ratio of Li:Co:P=2:1:1, and the mixture was placed in an alumina crucible. The mixture was heated at 900° C. for 24 hours in an electric furnace to give an oxide. The oxide was subjected to a powder X-ray diffraction analysis and identified against JCPDS card (hereinafter the same procedure was taken). The oxide was found to be a mixture of lithium phosphate, lithium-cobalt phosphate and cobalt oxide, containing 0.5 mole of cobalt and 0.5 mole of phosphorus per mole of lithium. The oxide was pulverized in a ball mill to give an active material powder having a particle size of not more than 20 μm.

PREPARATIVE EXAMPLE 2

In the same manner as in Preparative Example 1 except that lithium carbonate, basic cobalt carbonate, and a 85% aqueous solution of phosphoric acid were used so that the atomic ratio of Li:Co:P was 1:0.4:1.6, a mixture of lithium phosphate, lithium-cobalt phosphate and cobalt oxide was obtained. An active material powder having a particle size of not more than 20 μm was obtained from the mixture. The active material contained 0.4 mole of cobalt and 1.6 moles of phosphorus per mole of lithium.

PREPARATION EXAMPLE 3

In the same manner as in Preparative Example 1 except that lithium carbonate, basic cobalt carbonate, and a 85% aqueous solution of phosphoric acid were used so that the atomic ratio of Li:Co:P was 1:1:0.4, a mixture of lithium phosphate, lithium-cobalt phosphate and cobalt oxide was obtained. An active material powder having a particle size of not more than 20 μm was obtained from the mixture. The active material contained 1.6 moles of cobalt and 0.4 mole of phosphorus per mole of lithium.

EXAMPLE 1

Polyvinylidene fluoride (2 parts, part by weight, hereinafter the same, manufactured by Aldrick Chemical Co., US, Product number 18720-2) was dissolved in N-methyl-2-pyrrolidone (98 parts). The active material powder (90 parts) as obtained in Preparative Example 1 and acetylene black (8 parts) were added and mixed to give a paste dispersion.

Figure 3:
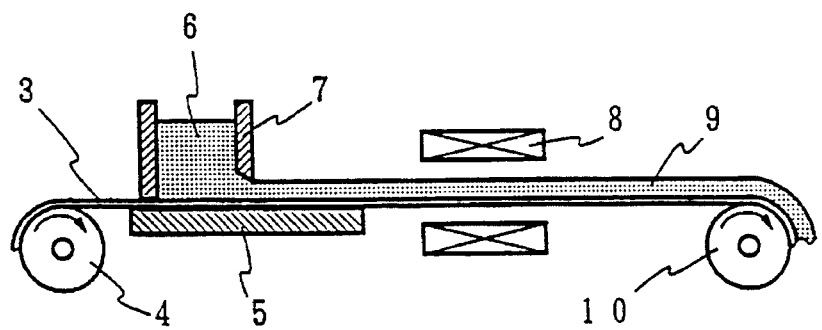
FIG. 3 is a schematic sectional view showing a production of a positive electrode material.

As shown in FIG. 3, the above-mentioned dispersion 6 was set on the upper portion of a support table 5 and continuously applied to an aluminium sheet (collector) 3 having a width of 50 mm and a thickness of 0.02 mm by the doctor blade method, while continuously delivering the aluminum sheet on the support table at a rate of 1 m/min via a sieve 4 having a diameter of 400 mm, and the thickness of the coating was adjusted by a doctor blade 7. The sheet was led into a drying furnace 8 (150° C., 1 m length) and dried, whereafter the sheet was wound on a sieve 10 having a diameter of 400 mm to continuously give a 0.1 mm thick positive electrode material 9 (a layer containing a novel active material powder).

In the above, the sieve 4 for delivering and the sieve 10 for taking up were synchronized to relax the tension applied to the aluminum sheet. The diameter of the winding sieve 10 was determined such that cracks would not be developed in the layer containing the powder of the novel active material.

Figure 4:
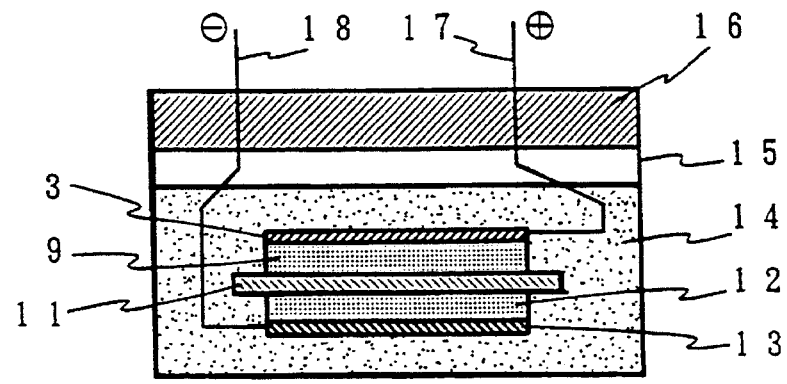
FIG. 4 is a sectional view showing one example of the structure of a battery.

As shown in FIG. 4, a positive electrode (5 cm×5 cm) formed from the positive electrode material 9 obtained in the above was placed on a negative electrode 12 (5 cm×5 cm) of metallic lithium on a nickel 13, via a separator 11 (6 cm×6 cm) comprising a micro-cellular polypropylene sheet, and immersed in an electrolyte solution 14 obtained by dissolving 1 mole of LiClO$_4$ in 100 parts of a mixed solvent of propylene carbonate and 1,2-dimethoxyethane (volume ratio=1:1) to manufacture a beaker cell. In the Figure, 15 is a beaker, 16 is a sealing plug made from a silicone rubber, and 17 and 18 are lead wires for positive and negative electrodes.

EXAMPLE 2

Figure 5:
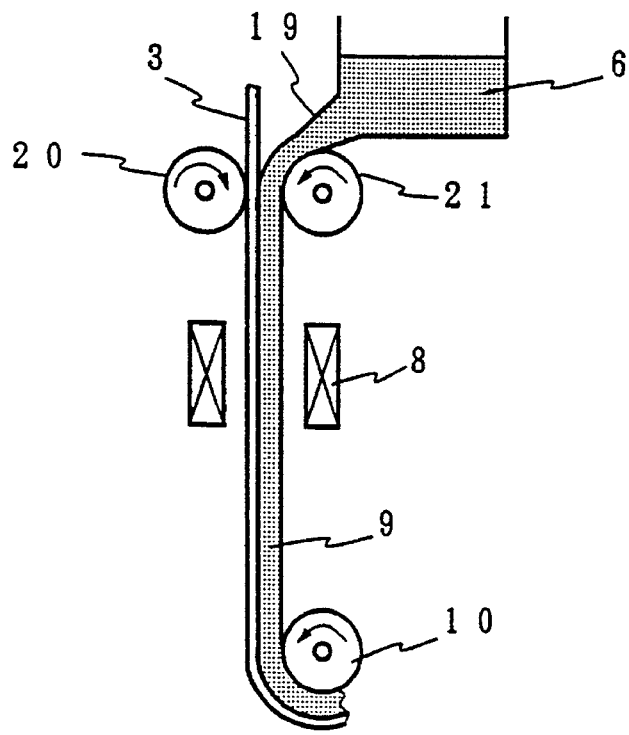
FIG. 5 is a schematic sectional view showing another production of a positive electrode material.

As shown in FIG. 5, the dispersion 6 obtained according to Example 1 was formed into a 0.8 mm×50 mm sheet via a nozzle 19 and supplied on a roll 21 by the roll forming method at a rate of 200 mm/min, while continuously delivering an aluminum sheet 3 (width 50 mm, thickness 0.02 mm) downward between counter-opposite rolls 20 and 21 at a rate of 1.6 m/min, to continuously apply the dispersion to the aluminum sheet via the counter-opposite rolls, whereafter the sheet was led into a drying furnace 8 (150° C., 1 m length), dried, wound on a sieve 10 having a diameter of 400 mm to continuously give a 0.1 mm thick positive electrode material 9. Using the material obtained, a beaker cell was manufactured according to Example 1.

EXAMPLE 3

Figure 6:
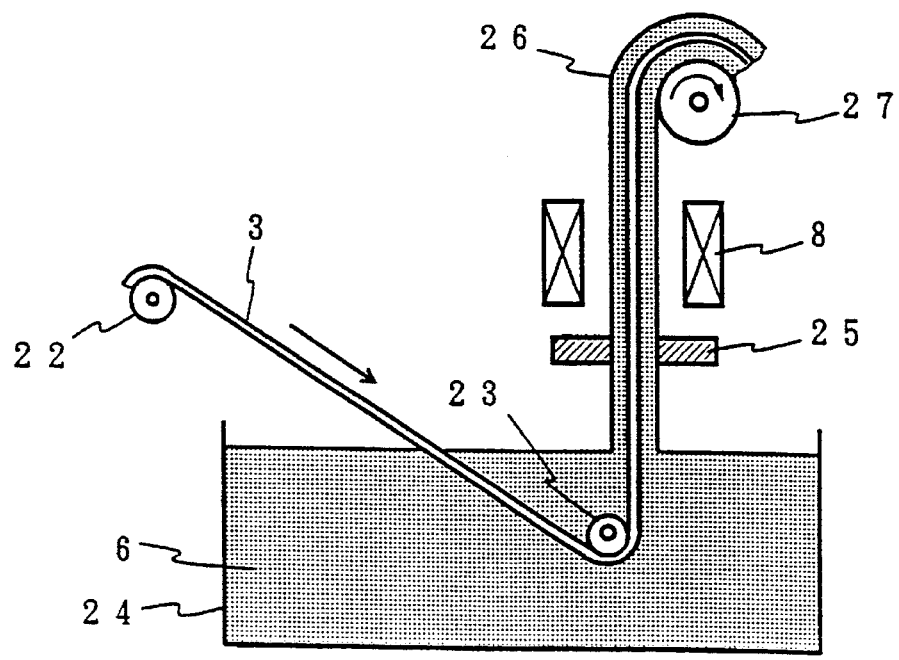
FIG. 6 is a schematic sectional view showing a still another production of a positive electrode material.

As shown in FIG. 6, an aluminum sheet 3 (width 50 mm, thickness 0.02 mm) was delivered into a tank 24 containing the dispersion 6 obtained according to Example 1, at a rate of 1 m/min via a sieve 22 having a diameter of 200 mm, and the sheet was turned via a sieve 23 (200 mm diameter) to take out the sheet from the tank, whereby a dispersion was applied to the both sides of the aluminum sheet by the dipping method. The sheet was passed through a die 25 to adjust the coating thickness, led into a drying furnace 8 (150° C., 1 m length), dried, wound on a sieve 27 having a diameter of 500 mm to continuously give a positive electrode 26 of an aluminum sheet carrying a 0.1 mm thick positive electrode material on the both sides. The respective sieves were rotated in a synchronized manner.

Figure 7:
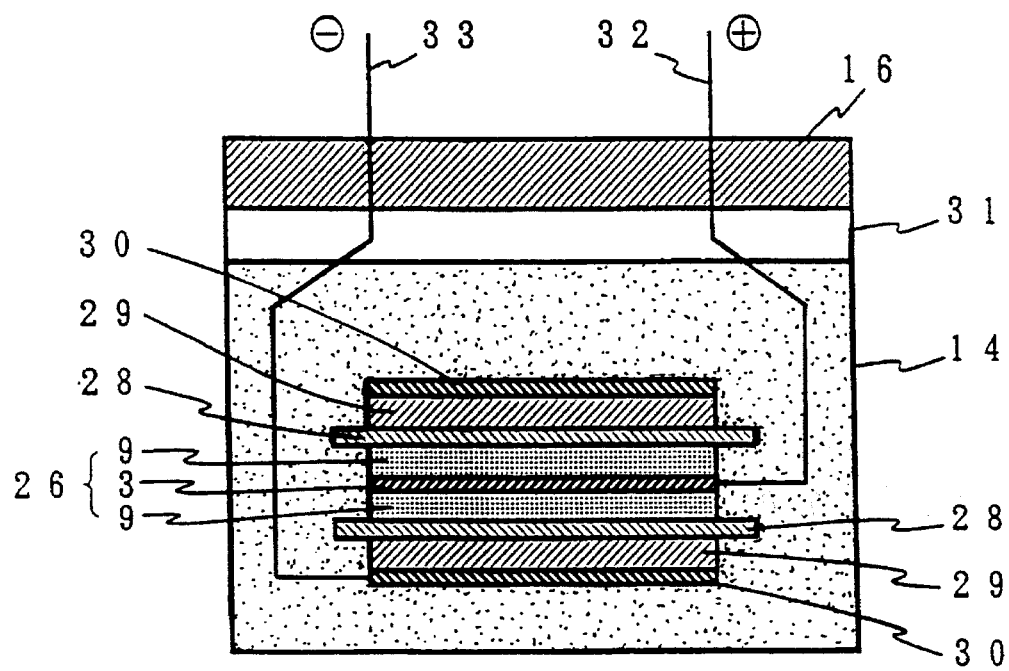
FIG. 7 is a sectional view showing another example of the structure of a battery.

As shown in FIG. 7, a positive electrode 26 (5 cm×2.5 cm) formed above was placed in between negative electrodes 29 (5 cm×2.5 cm) of a metallic lithium formed on a nickel 30, via separators 28 (6 cm×3 cm) comprising a micro-cellular polypropylene sheet, and immersed in an electrolyte solution 14 obtained according to Example 1 to give a beaker cell. In the Figure, 31 is a beaker, 16 is a sealing plug made from a silicone rubber, and 32 and 33 are lead wires for positive and negative electrodes.

EXAMPLE 4

An ethylene-propylene-diene terpolymer (2 parts, manufactured by Aldrick Chemical Co., US, Product number 20051-4) was dissolved in cyclohexane (400 parts). The novel active material powder (90 parts) as used in Example 1 and acetylene black (8 parts) were added and mixed to give a dispersion.

Figure 8:
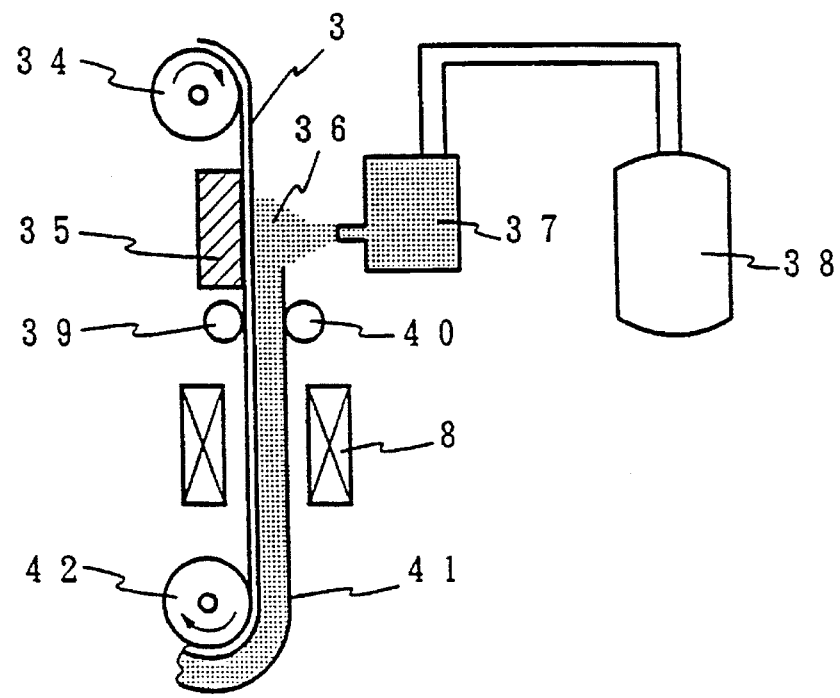
FIG. 8 is a schematic sectional view showing a still another production of a positive electrode material.

As shown in FIG. 8, the above-mentioned dispersion 36 was continuously sprayed on an aluminum sheet 3 (width 50 mm, thickness 0.02 mm) on a support table 35 heated to 80°–100° C., by the spray method using a spray nozzle 37 and a nitrogen gas, while delivering the aluminum sheet downward at a rate of 1 m/min via a sieve 34 having a diameter of 100 mm. The solvent was allowed to immediately evaporate on the heated support table to adhere the solid. The thickness was adjusted using crimp rolls 39 and 40, whereafter the sheet was led into a drying furnace 8 (150° C., 1 m length), dried, wound on a sieve 42 having a diameter of 300 mm to continuously give a 0.1 mm thick positive electrode material 41. According to Example 1, a beaker cell was formed using the material. In the Figure, 38 is a nitrogen bomb.

EXAMPLE 5

A vinylidene-hexafluoropropylene-tetrafluoroethylene copolymer (2 parts, Trademark Dai-el G501, manufactured by DAIKIN INDUSTRIES LTD.) was dissolved in dimethylformamide (98 parts). The novel active material powder (90 parts) as used in Example 1 and acetylene black (8 parts) were added and mixed to give a paste dispersion. Using the dispersion, a positive electrode material was formed, and a beaker cell was manufactured using the material.

EXAMPLE 6

An acrylonitrile polymer (2 parts, Trademark CYANORESIN, manufactured by Shin-Etsu Chemical Company Ltd.) was dissolved in dimethylformamide (98 parts). The novel active material powder (90 parts) as used in Example 1 and acetylene black (8 parts) were added and mixed to give a paste dispersion. According to Example 1, a positive electrode material was formed using the dispersion, and a beaker cell was manufactured using the material.

EXAMPLE 7

An ethylene-propylene-diene terpolymer (2 parts) as used in Example 4 was dissolved in cyclohexane (98 parts). The novel active material powder (90 parts) as used in Example 1 and acetylene black (8 parts) were added and mixed to give a paste dispersion. According to Example 1, a positive electrode material was formed using the dispersion, and a beaker cell was manufactured using the material.

COMPARATIVE EXAMPLE

Lithium carbonate and basic cobalt carbonate were mixed at an atomic ratio of Li:Co=1:1, and the mixture was placed in an alumina crucible. The crucible was heated at 900° C. for 24 hours in an electric furnace to give a lithium-cobalt compound oxide (active material). The oxide was pulverized in a ball mill to give a powder having a particle size of not more than 20 µm. The active material was analyzed by a powder X-ray diffraction analysis and was found to match JCPDS card No. 16-427.

In the same manner as in Example 1 except that the aforementioned active material powder was used instead of the novel active material as used in Example 1, a positive electrode material was obtained and a beaker cell was manufactured using the material.

Evaluation test

The beaker cells obtained in the above Examples and Comparative Example were charged with a constant current of 0.5 mA/cm$^2$ and discharged at 0.5 mA/cm$^2$. Discharge property was examined, the results of which are shown in FIG. 9.

Figure 9:
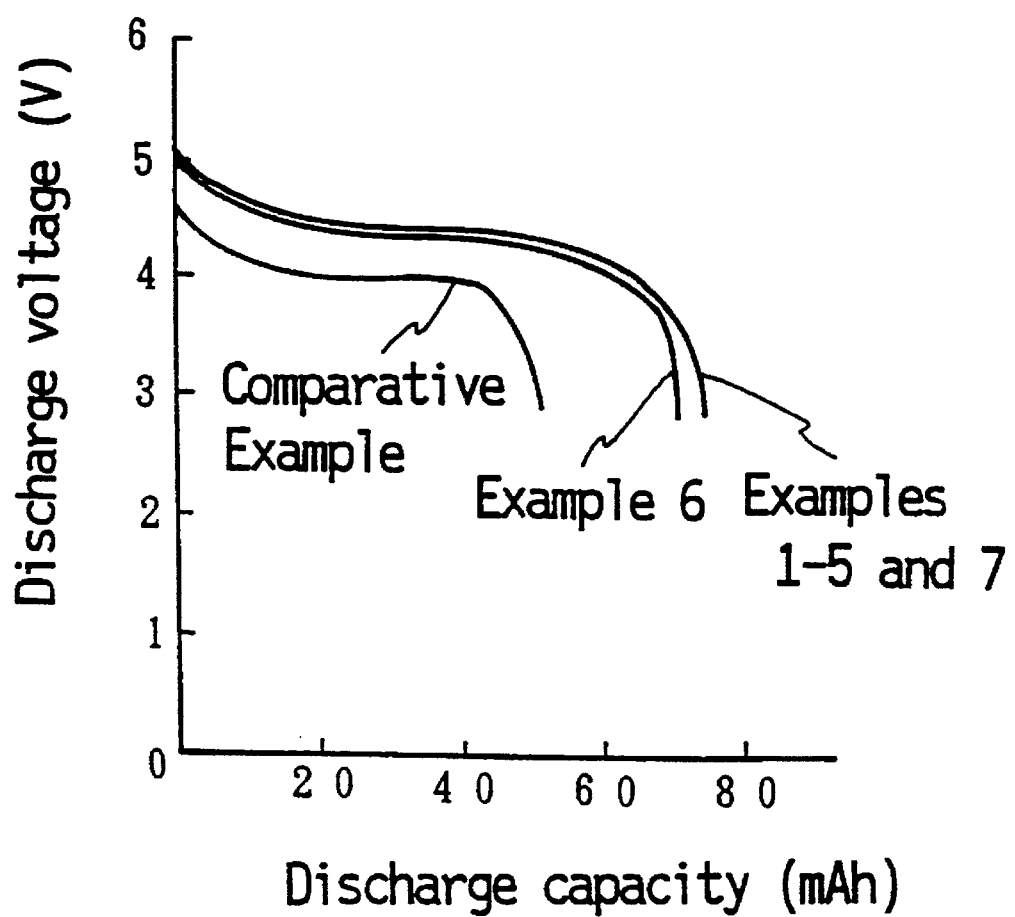
FIG. 9 is a graph showing the discharge property of a battery comprising the positive electrode materials prepared in Examples 1–7 and Comparative Example.

According to FIG. 9, the cells of Examples are superior to the cell of Comparative Example in discharge voltage and discharge capacity.

EXAMPLES 8–16

The novel active materials, binders and solvents were combined in various ways as shown in the following Table, and positive electrode materials were obtained according to Example 1. Using the materials, beaker cells were manufactured. In every Example, used were a solvent (97 parts), a binder (3 parts), a powder of active material (90 parts) and acetylene black (7 parts).

When the binder was PTFE, an aqueous dispersion thereof (Trademark Polyflon TFE dispersion, manufactured by DAIKIN INDUSTRIES LTD.) was diluted as necessary with distilled water.

The positive electrode material obtained using the above-mentioned PTFE was dehydrated by drying at 200° C. under reduced pressure for 1 week to adjust the residual water content in the positive electrode material to about 0.01% by weight. The positive electrode material obtained using an organic solvent was dried at 120° C. under reduced pressure for 3 hours to remove the solvent, thereby adjusting the residual solvent content in the positive electrode material to about 0.1% by weight.

The beaker cells obtained in the above Examples 8–16 were subjected to the measurement of overvoltage at 0.5 mA/cm$^2$ constant current, the results of which are summarized in the Table. In every Example, particularly when a fluororesin binder is used, overvoltage was especially small and battery capacity was high.

|        | novel active material | binder | solvent | overvoltage (V) |
|--------|----------------------|--------|---------|-----------------|
| Ex. 8  | Prep. Ex. 1          | PVDF   | NMP     | 0.020           |
| Ex. 9  | Prep. Ex. 2          | PVDF   | NMP     | 0.022           |
| Ex. 10 | Prep. Ex. 3          | PVDF   | DMF     | 0.025           |
| Ex. 11 | Prep. Ex. 1          | PTFE   | water   | 0.015           |
| Ex. 12 | Prep. Ex. 2          | PTFE   | water   | 0.018           |
| Ex. 13 | Prep. Ex. 3          | PTFE   | water   | 0.020           |
| Ex. 14 | Prep. Ex. 1          | PFA    | DMF     | 0.032           |
| Ex. 15 | Prep. Ex. 1          | EPDM   | CyH     | 0.08            |
| Ex. 16 | Prep. Ex. 1          | AcNP   | DMF     | 0.12            |

PVDF: poly(vinylidene fluoride)
NMP: N-methyl-2-pyrrolidone
DMF: dimethylformamide
PTFE: polytetrafluoroethylene
PFA: tetrafluoroethylene-perfluoroalkyl vinyl ether copolymer
EPDM: ethylene-propylene-diene terpolymer
CyH: cyclohexane
AcNP: acrylonitrile polymer (CYANORESIN)

Using the material for a positive electrode of the present invention, a positive electrode in a sheet form, comprising a novel active material, can be obtained, and a lithium battery superior in practical use, having excellent electromotive force, discharge voltage and discharge capacity, can be obtained. In addition, a long material for the positive electrode can be obtained stably and efficiently by a continuous process, according to the production method of the present invention.

What is claimed is:

1. A material for a lithium battery positive electrode in the form of a sheet comprising an organic binder and a powdery active material made from a member or a sufficient number of members selected from the group consisting of lithium phosphates, lithium-cobalt phosphates, cobalt oxides and lithium-cobalt oxides to provide lithium, cobalt and phosphorus in a proportion of more than 0.1 mole of cobalt and more than 0.2 mole of phosphorus both per mole of lithium.

2. The material for a lithium battery positive electrode according to claim 1, wherein the organic polymer binder includes a solution of a fluororesin in an organic solvent.

3. The material for a lithium battery positive electrode according to claim 1, wherein the organic polymer binder includes a fluororesin and an organic solvent.

4. The material for a lithium battery positive electrode according to claim 1, wherein the organic polymer binder includes at least one fluororesin soluble in an organic solvent, which is selected from the group consisting of tetrafluoroethylene-perfluoroalkyl vinyl ether copolymer, tetrafluoroethylene-hexafluoropropylene copolymer, tetrafluoroethylene-hexafluoropropylene-perfluoroalkyl vinyl ether copolymer, tetrafluoroethylene-ethylene copolymer, poly(vinyl fluoride), polyhexafluoropropylene, poly(vinylidene fluoride) and vinylidene fluoride-hexafluoropropylene-tetrafluoroethylene copolymer.

5. The material for a lithium battery positive electrode according to claim 3, wherein the organic solvent is N-methylpyrrolidone, dimethyl sulfoxide, γ-butyrolactone, propylene carbonate, ethylene carbonate or dimethylformamide.

6. A positive electrode comprising the material for a lithium battery positive electrode according to claim 1 on a conductive sheet.

7. A method for producing a material for a lithium battery positive electrode, which comprises coating a binder solution on a support sheet and then drying said binder solution, said binder solution comprising a powdery active material made from a member or a sufficient number of members selected from the group consisting of lithium phosphates, lithium-cobalt phosphates, cobalt oxides and lithium-cobalt oxides to provide lithium, cobalt and phosphorus in a proportion of more than 0.1 mole of cobalt and more than 0.2 mole of phosphorus both per mole of lithium.

8. The method for producing a material for a lithium battery positive electrode according to claim 7, wherein the binder solution includes a fluororesin solution or a fluororesin dispersion.

9. The method for producing a material for a lithium battery positive electrode according to claim 7, wherein the binder solution includes is a solution of a fluororesin in an organic solvent.

10. The method for producing a material for a lithium battery positive electrode according to claim 7, wherein the binder solution includes an organic solvent and at least one fluororesin selected from the group consisting of tetrafluoroethylene-perfluoroalkyl vinyl ether copolymer, tetrafluoroethylene-hexafluoropropylene copolymer, tetrafluoroethylene-hexafluoropropylene-perfluoroalkyl vinyl ether copolymer, tetrafluoroethylene-ethylene copolymer, poly(vinyl fluoride), polyhexafluoropropylene, poly(vinylidene fluoride) and vinylidene fluoride-hexafluoropropylene-tetrafluoroethylene copolymer.

11. The method for producing a material for a lithium battery positive electrode according to claim 9, wherein the organic solvent is N-methylpyrrolidone, dimethyl sulfoxide, γ-butyrolactone, propylene carbonate, ethylene carbonate or dimethylformamide.

12. The method for producing a material for a lithium battery positive electrode according to claim 7, wherein the support sheet is a conductive sheet.

13. The material for a lithium battery positive electrode according to claim 4, wherein the organic solvent is N-methylpyrrolidone, dimethyl sulfoxide, γ-butyrolactone, propylene carbonate, ethylene carbonate or dimethylformamide.

14. The method for producing a material for a lithium battery positive electrode according to claim 10, wherein the organic solvent is N-methylpyrrolidone, dimethyl sulfoxide, γ-butyrolactone, propylene carbonate, ethylene carbonate or dimethylformamide.

* * * * *